F. STEBLER.
DISTRIBUTING APPARATUS.
APPLICATION FILED MAY 12, 1908.
943,799.
Patented Dec. 21, 1909
2 SHEETS—SHEET 2.
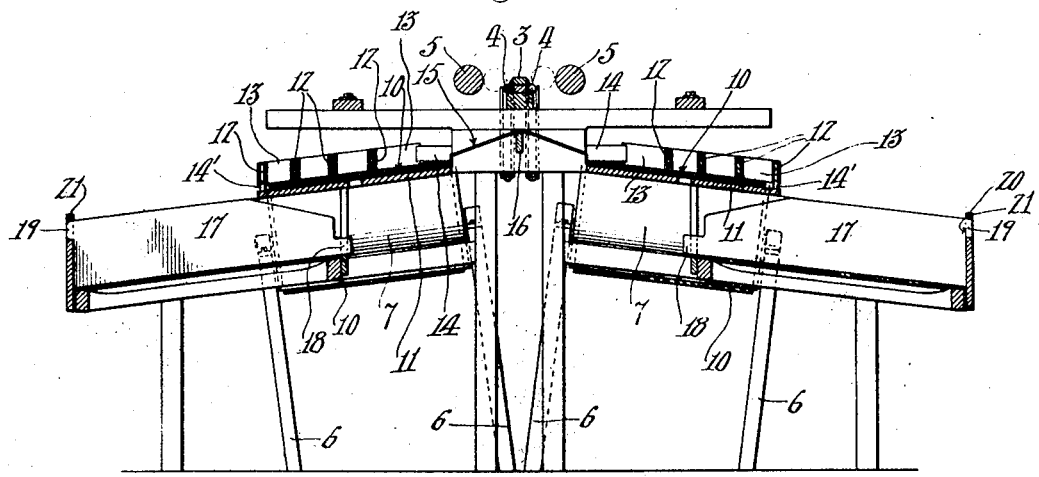
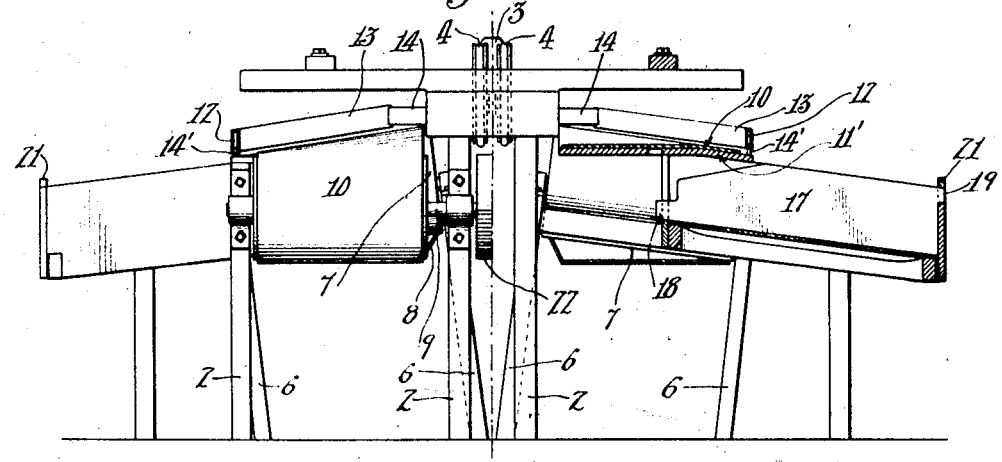
Witnesses:
Inventor:
Fred Stebler

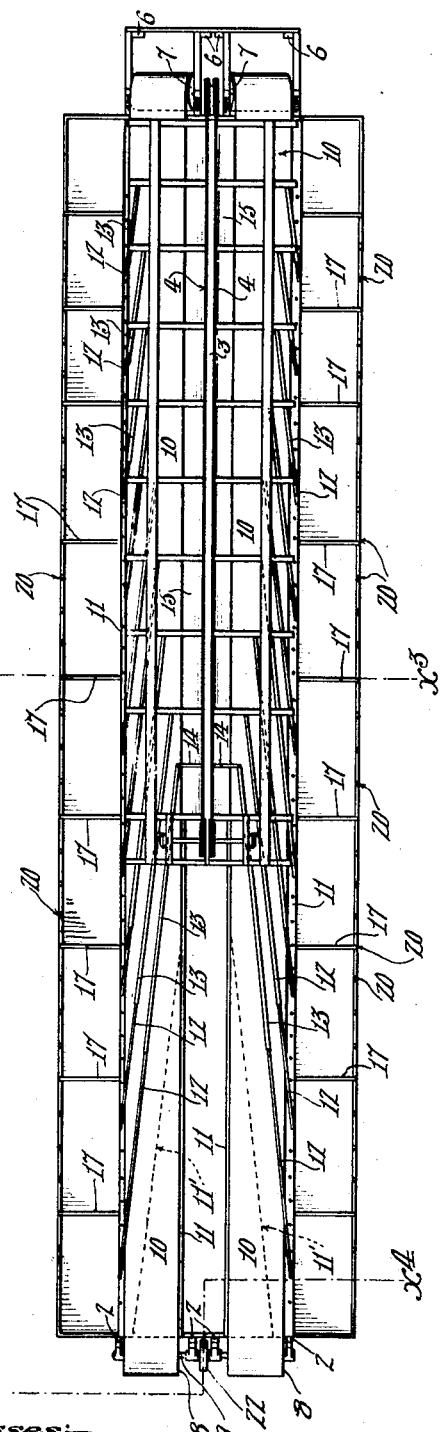

UNITED STATES PATENT OFFICE.

FRED STEBLER, OF RIVERSIDE, CALIFORNIA.

DISTRIBUTING APPARATUS.

943,799.  Specification of Letters Patent.  Patented Dec. 21, 1909.

Application filed May 12, 1908. Serial No. 432,548.

*To all whom it may concern:*

Be it known that I, FRED STEBLER, a citizen of the United States, residing at Riverside, in the county of Riverside and State of California, have invented a certain new and useful Distributing Apparatus, of which the following is a specification.

This invention relates to means for carrying or distributing fruit, and is more particularly designed for use in connection with a fruit sizer or grader, and has for its general object the provision of simple and efficient means whereby the several grades or sizes of fruits, such, for example, as oranges, may be conducted to wide bins suitably spaced along the floor of a packing house so as to provide sufficient room at the sides of the bins for the fruit packers to work.

Another object of the invention is to provide a suitable distributing apparatus in connection with a short or small grader or sizer, thus enabling the use of a short sizer or grader and still deliver the separated or sized fruit in bins of such width as to provide easy access thereto for the packers.

In packing fruit, such, for instance, as oranges, it is very desirable to have the sized or graded fruit delivered in wide bins, so that two or more packers may work at the side of each bin, as it has been found that where fruit is being separated or graded it is liable to run mainly to two or three different sizes. It is much desired, therefore, to use wide bins which will enable two, or even more, packers to work at the side of a given bin in wrapping the fruit in papers and packing the same in the boxes.

Heretofore it has been necessary either to provide a very large or long fruit grader or sizer, so as to conduct the several grades of fruit some distance along the grader before being discharged into the bins, or to utilize smaller bins. With this invention it is possible to use a relatively short grader or sizer and utilize a distributing conveyer, and to carry the separated and sized fruit to bins of the desired width extended much beyond the length of the grader and arranged at the sides of the conveyer.

With these and such other objects in view as shall appear from the hereinafter contained description of the apparatus and its operation, the invention consists in the provision, in connection with a fruit sizer or grader such, for example, as the "California grader" of Letters Patent of the United States to James Ish No. 458,422, dated August 25, 1891, or any other suitable grader, of a horizontally traveling conveyer so arranged that the conveyer is tilted sidewise so as to extend slightly downward from the side of the grading or sizing machine, and in the provision, in connection with such conveyer, of guiding means arranged along the conveyer and in suitable relation to the several grading discharges of the separating means as to form ways through which the separated fruit is carried by said conveyer and thereby delivered to suitable bins arranged below and along such conveyer.

The invention consists further in the provision of means whereby such guiding means may be adjusted to deliver the given grade or size of fruit, either to any particular portion of the bin or to any one of several successive bins, so that in case the fruit being sized or graded runs very heavily of a given size or grade, such fruit may be delivered into a series of bins, thus enabling a large number of packers to have ready access to that size or grade of fruit and handle the fruit and pack the same as rapidly as graded or sized.

A further object of the invention is to provide in connection with such fruit grader or sizer, and such conveyer and guiding means, removable and adjustable partitions in the bins so that the width thereof may be varied to suit the requirements.

By thus providing bins whose longitudinal extension may be adjusted with respect to the longitudinal extension of the conveyer of the distributing apparatus, it is possible to provide the necessary bin room for all of the different sizes or grades of the fruit regardless of the run of the fruit. In packing oranges it is often found that the run of the fruit is particularly heavy to one or two given grades or sizes and it is essential in practical use to be able to provide sufficient bin room for the sizes or grades of which there are the greatest number of oranges in a given run. This has been found to be one of the great difficulties which have heretofore existed with all apparatus where machinery has been used in sizing or grading oranges, and it is one of the important objects of this invention to provide means which will accomplish this result without interfering with the grading or sizing and at the same time permit the compact installation of the machinery and the ready access to the bin room by the packers.

Further objects and ends to be attained will be apparent from the construction and operation of my distributing apparatus as hereinafter described and shown in the drawings, wherein I have shown one embodiment of the invention, it being apparent that many modifications may be made without departing from the spirit or scope of the invention.

The invention will be more readily understood by reference to the accompanying drawings forming a part of this specification, and in which—

Figure 1 is a plan view of a distributing apparatus embodying my invention, the same being shown in connection with a double or two sided fruit grader or sizer, the fruit grader or sizer indicated in the drawings being the well known "California grader", the main features and principles of which are set forth in the Ish patent No. 458,422 before referred to, but, as indicated, instead of a flat belt, a round rope belt traveling in a groove is shown as the same has ordinarily been used in such California grader; and the apparatus being duplicated to discharge fruit on both sides of such double grader. Fig. 2 is a side elevation of such apparatus. Fig. 3 is a cross sectional view on the line $x^3$—$x^3$ Fig. 1. Fig. 4 is a cross sectional view on the line $x^4$— Fig. 1. Fig. 5 is an enlarged, detail view of one of the guiding means, showing the telescopic construction thereof and manner of pivoting the same upon the supports thereof on the frame of the machine.

In the preferred form of the invention and in the embodiment shown in the drawings, the fruit grader or grading is mounted upon suitable standards 2 in the ordinary or any preferred manner, and such fruit grader is made up of a longitudinal divider 3 provided with a groove in which the grading belt or rope 4 travels. 5 (Fig. 3) indicates the grading roller. The construction of this longitudinal divider, grading rope and grading roller is commonly known in the art and is illustrated in patent to Robert Strain No. 730,412 of June 9, 1903, and I have, therefore, considered it not essential to more fully illustrate the same in the drawings herein. Said grading element is adjusted to deliver or discharge fruit of different grades at different longitudinal portions thereof.

As indicated, the grading rope 4 is carried by suitable sheaves suitably mounted and driven. As shown in the drawings, two grading ropes and two grading rollers 5 are shown in the drawings, thus forming a double or two sided machine. As each side, however, is simply a duplicate of the other, I will describe only one of the two fruit distributing apparatus, the other being a duplicate. The fruit distributing means comprises supporting and guiding means, namely, the conveyer 10, and guide means 12, 13, arranged alongside of the grading element and adjusted to receive the fruit therefrom and to deliver the same at longitudinally distributed points, for example to a series of bins. The machine is of especial advantage in delivering to a series of bins where longitudinal extension is greater than that of the grading element, thereby giving more room for the packers, and for that purpose the distributing means is constructed so that its delivery portion is of greater longitudinal extension than the grading element. At one end of the frame of the machine I provide suitable standards 6 which, as shown, are mounted at an incline or angle so that the sheave 7 carried thereby is mounted so as to be inclined downwardly away from the grading element. The other end of the machine is provided with a sheave 8 whose axis or shaft 9 is arranged horizontally in suitable bearings in the standards 2 of the frame.

As indicated best in Fig. 1 of the drawings, the longitudinal traveling conveyer or belt 10 is carried along under the grading element at such inclination, i. e., inclined downwardly away from the gradeway formed by the traveling belt and grading roller, but arranged under the same so that the fruit discharged from such gradeway falls onto the inclined traveling conveyer. The upper run of the belt or traveling conveyer 10 is supported throughout the length of the machine by a bed 11 which extends at an angle inclined downwardly from the grading element toward the bins the width of the belt, and at a point beyond the length of the grading element I provide a hip 11' in this bed 11 underneath the traveling conveyer and adapted to bring the conveyer down into a horizontal position so that the belt or conveyer is delivered upon the sheave or pulley 8 in a horizontal position crosswise of the belt, thus providing for the belt traveling upon the sheaves 7 and 8 and preventing the same running off therefrom. At distances along the frame of the apparatus, corresponding to the several grades or sizes of fruit arranged to be discharged from the grading element, I provide a series of guiding means preferably made up in two sections 12, 13, the section 13 being pivotally mounted upon suitable bars or studs 14 of the frame of the machine. The section 13 is preferably of such form as to receive within it the section 12 so that the section 12 may be drawn out or pushed back within the section 13 so as to bring the end of the guiding means at any point along the bin to which it is desired to deliver the given grade of fruit. The front end of the section 12 of such guiding means is provided with a socket in which a suitable pin 14' may be placed, such pin being also inserted in one of the holes 15 along the edge of the bed 11. It is thus seen that by extending or contracting the telescopic guiding means, the point of delivery of the fruit from the belt may be adjusted as desired. In general, when the series of bins is longer than the grading element, the guides 12, 13 will diverge outwardly and will all be directed obliquely forward and outward. Underneath the grading element I arrange a canvas 15 upon which the fruit from the grading element is adapted to drop or be delivered and by which such fruit is directed onto the traveling conveyer 10. Where a double grader is used, this canvas preferably extends from a point at the inner edges of the traveling conveyers 10 over a suitable support 16 arranged below the longitudinal divider 3. Underneath the apparatus and extending out beyond the sides thereof, I arrange a suitable frame adapted to receive the usual canvas false bottom. This frame is provided with a series of removable partitions 17 preferably so arranged that the position of the partitions may be varied as desired to provide fruit receiving bins positioned with respect to the grading element as desired and thus made of adjustable width so that bins for a particular grade may be provided of the size corresponding to the run of the fruit. As shown in the drawings, these adjustable partitions 17 are provided with portions 18 adapted to be inserted in slots formed in the back wall of the bin frame, there being a suitable number of such back slots to provide suitable amount of adjustment. The front ends of the partitions 17 are provided with a portion 19 adapted to be inserted in slots 20 on the front wall of the bin frame. Preferably the removable partitions are held in place by a strip 21 lying upon the front wall of the bin frame and secured in any suitable manner. The conveyers 10 are driven by driving one of the pulleys or sheaves 7, 8 in the ordinary or any preferred manner such, for instance, as a pulley or sheave 22 from which a belt may pass to any suitable source of power. By thus providing means whereby the longitudinal extension of the bins, with respect to the conveyer, may be adjusted to suit the run of the fruit, the bin room and the distribution of the sized fruit is wholly within the control of the operator of the apparatus, and it is possible to so deliver the fruit that immediate and ready access can be had thereto by packers in sufficient number to readily and quickly handle and pack the sized fruit.

In operation the fruit being discharged from the grading element onto the canvas 15 rolls onto the traveling conveyer between two of the adjustable guiding means which form a trough for the travel of the fruit. As the conveyer is inclined downwardly from the grading element and toward the bins, the longitudinal movement of the belt, assisted by gravity, carries the fruit through such trough and discharges the same at the end of the guiding element. It is readily seen that by this arrangement the fruit may be delivered to any portion of the bin as desired, and wide bins may be used so that a large number of packers may work at any one bin.

It is much preferable to slightly incline the conveyer 10 downward toward the bins. If the conveyer 10 is arranged horizontal and not inclined, the fruit must be forced into contact with the guiding means 12, 13, and this forcible and continuous contact will cause abrasion of the tender skins of fruit, such as oranges, and cause the rapid decay thereof. By inclining the conveyer the downward pitch is utilized to cause the oranges to roll toward the outer or discharge edge of the conveyer preventing the continued forcible contact with the guiding means which would occur were the conveyer flat or horizontal in cross section. When the conveyer is arranged flat the oranges are carried to the guiding means at the rear or most advanced side of the chute thereby formed and the continued movement of the conveyer holds the oranges in forcible contact against such guiding means as the oranges are carried across the width of the belt along the guiding means.

Having described my invention, I claim:—

1. The combination with a fruit grading element constructed to deliver fruit at different longitudinal portions, of traveling supporting and distributing means extending laterally from the grading element and inclined downwardly away therefrom, the longitudinal extension of the delivery portion of the said distributing means being greater than the longitudinal extension of the grading element.

2. In combination with a grading element constructed to deliver fruit at different longitudinal portions, a distributing apparatus therefor comprising a conveyer traveling longitudinally of the grading element, and guiding means arranged along the conveyer forming chutes to guide the fruit and bins arranged along the length of said conveyer and at the sides thereof.

3. The combination with a grading element adapted to deliver graded fruit at different longitudinal portions of the element, a traveling conveyer extending longitudinally under said grading element and extending beyond the end thereof a series of bins whose longitudinal extension is greater than the longitudinal extension of the grading element arranged along the side of said conveyer, and guiding means for guiding the fruit along said conveyer and from the grading element to the series of bins.

4. The combination with a grading element and a series of bins, of a conveyer traveling longitudinally under the grading element and along the side of the series of bins, and guiding means arranged along the conveyer to guide the fruit to the bins, said guiding means diverging toward the bins.

5. In combination with a fruit grader comprising a suitably mounted member and a traveling belt arranged adjacent to said member so as to form the way or chute, for the fruit, a series of bins whose longitudinal extension is greater than the longitudinal extension of the grader, a traveling conveyer arranged under said fruit grader and extending at the side of said series of bins, guiding means for guiding the fruit along said conveyer to said bins, and means for adjusting the longitudinal position of the outer ends of said guiding means, and thereby determine the portion of said bins to which the graded fruit is delivered.

6. A distributing apparatus comprising, in combination with a grading element, a horizontally traveling conveyer inclined downward away from said grading element, bins arranged below and along said conveyer, and guiding means arranged along the conveyer providing chutes for directing fruit to the bins.

7. In combination with a fruit grader comprising a graduated rotary member and a traveling endless belt forming the way or chute for the fruit to travel along and thereby be graded by gravity, a traveling conveyer arranged thereunder and of greater length than said grader, a series of bins arranged at the side of said conveyer and means in conjunction with said conveyer for directing the fruit along said conveyer to the respective bins.

8. In combination with a fruit grader comprising a graduated rotary member and a traveling endless belt arranged adjacent thereto and forming therewith the grading way or chute for the fruit to pass along and be graded by gravity, a traveling conveyer arranged thereunder, a series of bins arranged along the side of said conveyer, an adjustable guiding means arranged along the conveyer and forming a chute for directing the graded fruit from the point of discharge from said conveyer into said bins, said guiding means being adjustable to shift the point of discharge longitudinally of the conveyer.

9. In combination with a grader comprising a graduated rotary member and a traveling endless belt arranged adjacent thereto and forming in conjunction therewith the way, or chute, for the fruit to pass along and be separated or assorted by gravity, a distributing apparatus for a fruit grader or sizer comprising a horizontally traveling conveyer, a pulley for said conveyer mounted on an inclined axis and a second pulley mounted on a horizontal axis, the conveyer being extended between and passing over said pulleys, a bed supporting the upper run of said conveyer and provided with a hip over which conveyer travels as it approaches said horizontal pulley, and guiding means arranged along the conveyer forming chutes for the fruit.

10. The combination with a fruit grading element and a series of bins, of a distributing apparatus therefor, comprising a horizontally traveling conveyer, a pulley for said conveyer mounted on an inclined axis and a second pulley mounted on a horizontal axis, the conveyer being extended between and passing over said pulleys, a bed supporting the upper run of said conveyer and provided with a hip over which conveyer travels as it approaches said horizontal pulley, and guiding means arranged along the conveyer forming chutes for the fruit.

11. The combination of a fruit grading element and a series of bins, the walls of said bins being adjustable longitudinally of the series, and a distributing apparatus comprising a conveyer traveling longitudinally between the fruit grading element and the bins, and guide means arranged along the conveyer and forming chutes for guiding the fruit from said conveyer to said bins, said guide means being adjustable to shift the longitudinal position of their outer ends in accordance with the longitudinal positions of the walls of the bins.

12. In combination with a fruit grader comprising a graduated rotary member and a traveling endless belt arranged adjacent thereto and forming in conjunction therewith the way, or chute, for the fruit to pass along and be separated or assorted by gravity, a distributing apparatus comprising fruit supporting means outwardly and downwardly inclined from one side to the other, and guide means extending obliquely across the supporting means, each guide means comprising telescoping members.

13. In combination with a fruit grader comprising a graduated rotary member and a traveling endless belt arranged adjacent thereto and forming in conjunction therewith the way, or chute, for the fruit to pass along and be separated or assorted by gravity, a distributing apparatus comprising fruit supporting means outwardly and downwardly inclined from one side to the other, guide means extending obliquely across the supporting means, each guide means comprising telescoping members, and means for adjusting the longitudinal position of the outer ends of said members.

14. In combination with a fruit grader comprising a graduated rotary member and a traveling endless belt arranged adjacent thereto and forming a grading way or chute for the fruit to pass along and be separated or assorted by gravity, a series of bins, a distributing apparatus therefor comprising a conveyer traveling longitudinally of the grading element and guiding means arranged along the conveyer forming chutes to guide the fruit to said bins.

15. In combination with a fruit grader comprising a graduated rotary member and a traveling endless belt arranged adjacent thereto and forming a grading way or chute for the fruit to pass along and be separated or assorted by gravity, of traveling separating and distributing means extending under said fruit grader and inclined downward away therefrom, the longitudinal extension of the delivery portion of said distributing means being greater than the longitudinal extension of said grader, and a series of bins arranged along said distributing means.

16. In combination, a grading element and a distributing apparatus therefor, and bins arranged at the side of the distributing apparatus, said distributing apparatus comprising a conveyer traveling horizontally and longitudinally of the grading element and under the same, guiding means extending transversely of the conveyer and forming separated chutes for the fruit and opening into respective bins.

17. A grading element and fruit bins, in combination with a conveyer of greater length than the grading element and extending alongside said fruit bins, and guiding means, on the surface of said conveyer and forming separated chutes for the separated and sized fruit, extending transversely of the conveyer.

18. In combination, a grading element and a distributing apparatus therefor, bins arranged at the side of the distributing apparatus, said bins provided with movable partitions whereby the widths of the bins along the distributing apparatus may be adjusted, said distributing apparatus comprising a conveyer traveling horizontally and longitudinally of the grading element and under the same, and guiding means extending transversely of the conveyer and forming separated chutes for the fruit and opening into respective bins.

19. A grading element, in combination with a distributing apparatus comprising a horizontally traveling conveyer inclined downward away from said grading element, guiding means arranged along the conveyer providing separated chutes for directing the fruit, and bins arranged below and along side said conveyer, said bins provided with movable partitions whereby the width of the bins may be adjusted with respect to the longitudinal extension of said conveyer.

20. The combination with a grading element and a series of bins, of a conveyer traveling longitudinally under the grading element and along the side of the series of bins, and adjustable guiding means arranged along the conveyer to guide the fruit to the bins, said guiding means diverging toward the bins, said bins provided with movable partitions whereby the longitudinal extension of the respective bins may be adjusted with relation to the length of the conveyer.

In testimony whereof, I have hereunto set my hand at Riverside, California, this sixth day of May 1908.

FRED STEBLER.

In presence of—
DORA V. GAMBLE,
FREDERICK J. LYON